United States Patent
Gerber

[15] 3,681,846
[45] Aug. 8, 1972

[54] KNIFE BLADE CONSTRUCTION

[72] Inventor: Heinz Joseph Gerber, W. Hartford, Conn.

[73] Assignee: Gerber Garment Technology, East Hartford, Conn.

[22] Filed: Feb. 9, 1970

[21] Appl. No.: 9,619

[52] U.S. Cl. .................................. 30/355, 76/104
[51] Int. Cl. ................................................ B26b 9/02
[58] Field of Search.30/168, 346.56, 346.59, 346.60, 30/348, 349, 350, 351, 355, 274, 273; 143/133; 76/104, DIG. 6, DIG. 11

[56] References Cited

UNITED STATES PATENTS

| | | | |
|---|---|---|---|
| 1,960,879 | 5/1934 | Russell | 76/DIG. 11 |
| 3,263,330 | 8/1966 | Ferrara | 30/346.6 X |
| 3,416,227 | 12/1968 | McDonald | 30/351 X |

FOREIGN PATENTS OR APPLICATIONS

| | | | |
|---|---|---|---|
| 400,565 | 10/1933 | Great Britain | 143/133.2 |
| 877,157 | 9/1961 | Great Britain | 30/168 |
| 1,018,976 | 2/1966 | Great Britain | 143/133.2 |

Primary Examiner—Theron E. Condon
Assistant Examiner—J. C. Peters
Attorney—McCormick, Paulding and Huber

[57] ABSTRACT

The knife blade disclosed has outer layers of a relatively soft carrier material, such as steel or aluminum, and an inner layer of relatively hard material such as tungsten carbide. The inner layer may be deposited on one or the other, or both outer layers, or may be bonded thereto as a separate member, or may be inserted in cavities defined by these outer layers of carrier material. When assembled, the thickness of the harder inner layer varies in the longitudinal direction so that when the longitudinally extending cutting edge is used to cut in a reciprocating action, said edge will wear away in an uneven fashion producing a serrated edge which need not be sharpened as frequently as a conventional knife blade.

4 Claims, 6 Drawing Figures

PATENTED AUG 8 1972
3,681,846
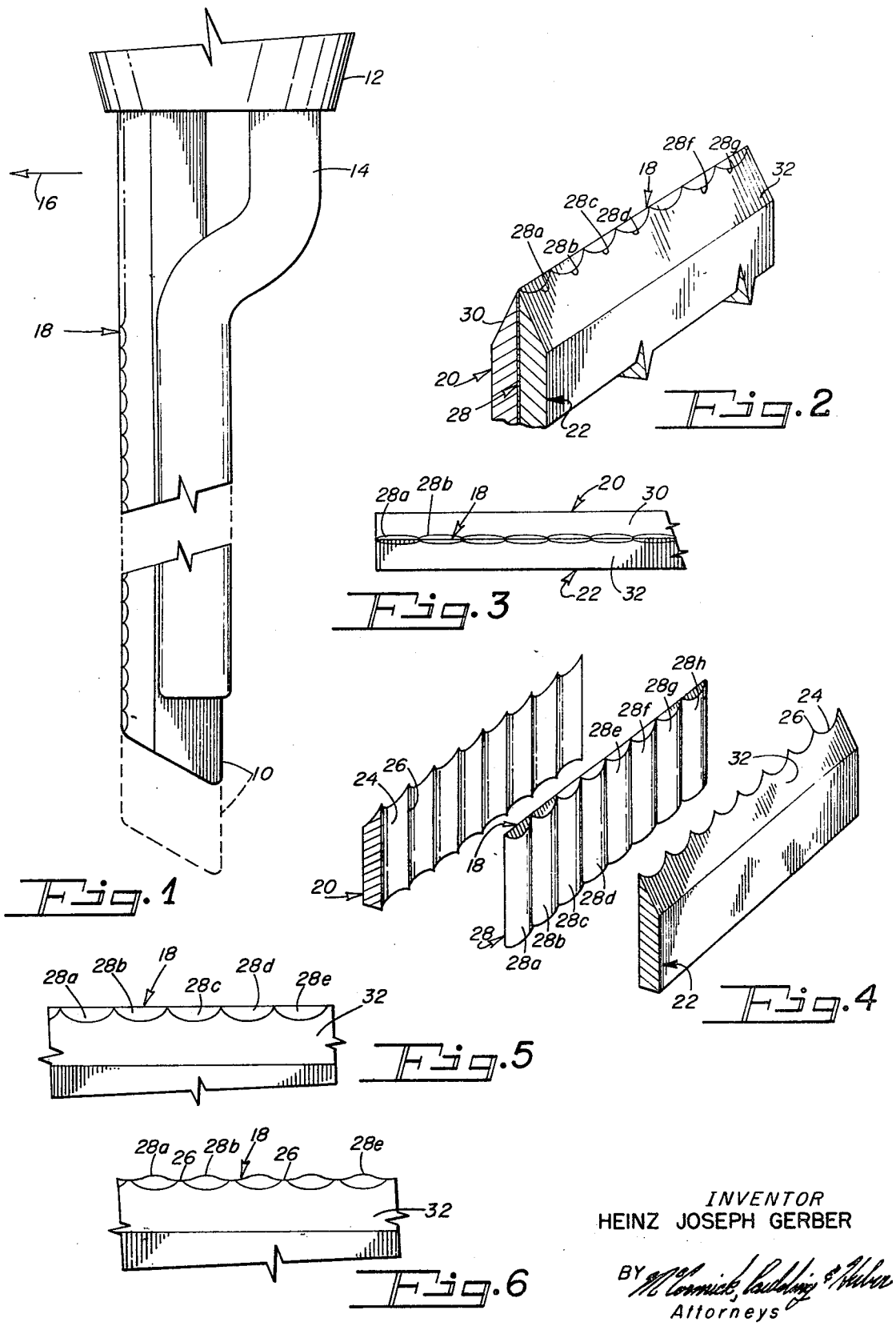
INVENTOR
HEINZ JOSEPH GERBER
BY McCormick, Paulding & Huber
Attorneys

KNIFE BLADE CONSTRUCTION

SUMMARY OF INVENTION

This invention relates generally to reciprocating knife blades of the type adapted for use in an apparatus of the type disclosed in an application filed on May 5, 1969, Ser. No. 821,723 now U.S. Pat. No. 3,548,697 entitled "Apparatus for Cutting Sheet Material", and deals more particularly with a knife blade construction which is less susceptible to wear than conventional blades. This blade includes at least one layer of material, such as aluminum or steel, defining an alternating series of valleys and ridges on one of its two sides, and has a layer of material somewhat harder than the first and defining projecting portions located in said valleys. Both said layers have at least one common longitudinally extending cutting edge defined therein and oriented at a substantial angle to the axes of said valleys and ridges. The cutting edge portions so defined by the ends of said projecting portions of said harder layer and also by the ridge portions of the somewhat softer layer will be relieved along at least one side in a conventional fashion so as to define a cutting edge which is initially linear in the longitudinal direction. However, the alternately hard and less hard segments of this cutting edge during normal use of the blade, will tend to wear away so that the less hard segments wear faster than the harder segments, with the result that the cutting edge will become serrated with use rather than becoming dulled.

BRIEF DESCRIPTION OF THE DRAWING

FIG. 1 is an elevational view of a knife blade constructed in accordance with the present invention, and oriented in a sheath or the like of the type disclosed in the patent application mentioned hereinabove, the knife blade itself being shown in two positions so as to indicate the reciprocating motion possible with an apparatus of the type disclosed in said patent application.

FIG. 2 is a perspective view of a segment of the knife blade shown in FIG. 1 revealing the details of construction of the cutting edge thereof.

FIG. 3 is a plan view of the knife blade segment shown in FIG. 2.

FIG. 4 is a perspective view showing the outer carrier layers in exploded relation to the hardened material comprising the inner layer of a knife blade constructed in accordance with the present invention.

FIG. 5 is an elevational view of the segment of the knife blade shown in FIG. 2 after the same has been sharpened and prior to any extended use.

FIG. 6 is a view similar to FIG. 5 showing the effect of wear on the cutting edge in a knife blade constructed in accordance with the present invention.

DETAILED DESCRIPTION

Turning now to the drawing in greater detail, FIG. 1 shows an elevational view of a knife blade 10 constructed in accordance with the present invention, and provided in a mechanism 12 by means of which the blade can be reciprocated between the positions shown in full lines and in broken lines in this view. A shroud or guide 14 is provided at the back edge of this blade 10 to support it as it is so reciprocated and although this blade is intended for use in an apparatus of the type disclosed in the patent application cited hereinabove, it will be apparent that other uses might be made for a blade of this type without departing from the scope of the present invention. As disclosed therein, the mechanism is adapted to move the blade forwardly in the direction of the arrow 16 so that the leading, or cutting edge 18, of the blade 10 is adapted to cut material laid flat, or horizontally before it, and this knife blade is particularly well suited for cutting sheet material of the type used in the textile industry. By way of example, the knife blade disclosed herein would be used in the foregoing environment so as to cut material on both the up, and the down stroke, and while the mechanism 12 is moved in the direction of the arrow 16 with the lower end portion of the knife blade cutting its way through some underlying material of relatively severable consistency. The sheet material to be cut would be placed upon the upper surface of said severable material in a flat condition and held by any convenient means while the blade is so moved.

Turning now to a more detailed description of the knife blade shown in the drawing, FIG. 4 shows a portion of the blade as comprising left and right-hand outer layers, 20 and 22 respectively, which define on their respective inner faces, a series of valleys and ridges 24 and 26, with the longitudinally extending cutting edge 18 of the blade being oriented perpendicularly, or at a substantial angle, with respect to the laterally extending axes of these valleys and ridges. As so arranged, it will be apparent that these outer layers 20 and 22 can be brought together to form the knife blade shown in FIG. 2. These outer layers 20 and 22 thereby define an elongated carrier means having a longitudinally extending edge portion which defines a plurality of cavities opening laterally outwardly onto said carrier edge portion.

In further accordance with the knife blade construction shown, in the drawing, an inner layer of harder material is provided between the outer layers 20 and 22, and said inner layer is preferably formed with complimentary left and right-hand surfaces defining projecting portions located in the valleys 24, 24 and ridges 26, 26 described above. The inner layer is preferably formed from a relatively hard material, such as tungsten carbide, whereas the outer layers 20 and 22 may be formed of steel or aluminum or some material less hard than the material from which the inner layer is fabricated. As so constructed and arranged, the inner layer 28 can be seen from FIG. 4 to comprise a plurality of inserts 28a, 28b and 28c etc. each of which is provided in one of the cavities defined by the cooperating valleys, 24, 24 in the outer layers to provide a laminated cutting blade. These inserts 28a, 28b and 28c are arranged adjacent to one another to define a continuous layer in the embodiment shown in the drawing, but it will, of course, be apparent that some spacing might be provided between these inserts in the event that the knife blade were to be constructed by physically inserting the tungsten carbide material in cavities defined in the outer layers after the outer layers have been joined together to form the carrier means. Alternatively, the tungsten carbide material might be deposited first upon each of the outer layers 20 and 22, separately, and the entire assembly subsequently pressed together to form a knife blade in accordance with the present invention.

Whichever method of construction is adapted for forming a knife blade of the type shown in FIG. 1, the resulting blade can be seen to have a cutting edge with relieved side portions 30 and 32, which side portions cooperate to define a longitudinally extending cutting edge 18 characterized by alternately hard and less hard segments defined by the ridges 26, 26 and tungsten carbide inserts 28a, 28b, 28c etc. As a result of this construction, normal use of the type to be encountered in the patent application cited above for a knife blade of the type disclosed, results in faster wear in the area of the less hard segments, and correspondingly slower wear in the area of the tungsten carbide material so that the resulting cutting edge tends to become serrated with use rather than merely becoming dulled. A comparison of FIGS. 5 and 6 illustrates this result rather graphically. FIG. 5 shows a recently sharpened knife blade of the type disclosed herein wherein the cutting edge 18 is initially linear and defined primarily by the outer end portions of the tungsten carbide inserts 28a, 28b and 28c. FIG. 6 on the other hand shows the result of wear upon the cutting edge 18 of the knife blade, and the cutting edge in this view can be seen to be serrated, or formed with a series of equally spaced teeth, as a result of more wear occurring in the area of the ridges 26, 26 and somewhat less wear in the area of the tungsten carbide inserts 28a, 28b and 28c.

As shown in FIG. 3, the cutting edge 18 of the knife blade is defined in part by the hard tungsten carbide inserts 28a, 28b and also by the less hard outer layers 20 and 22, which are relieved as shown at 30 and 32. From this view, it will be apparent that the portion of the cutting edge 18 which is defined by the hardened steel inserts 28a, 28b comprises a relatively narrow, or thin middle layer, which varies in thickness throughout its length. Each of these inserts 28a, 28b has a generally elliptical cross sectional shape with the longer of its two elliptical axes being oriented in the longitudinal direction with respect to the outer carrier layers 20 and 22. In addition, these inserts, with their elliptical cross sectional shapes, are located in tangent relationship to one another. The lines of tangent being located at the ends of the longer elliptical axes, and this elliptical cross section is constant throughout the length of each insert, or in the lateral direction of each of said inserts, so that as they wear, and as the knife blade is resharpened, the advantages to the present invention will be continuously realized throughout the life of the blade.

I claim:

1. A blade for cutting sheet material and comprising elongated carrier means having a longitudinally extending edge portion which defines a plurality of cavities opening laterally outwardly onto said carrier edge portion, a plurality of inserts in said cavities and made from a material which is considerably harder than the carrier material, said inserts being of generally elliptical cross sectional geometric shape and being equally spaced along the carrier edge portion to define a cutting edge in cooperation therewith.

2. A blade as set forth in claim 1 further characterized in that each insert has the longer of its elliptical axes being oriented in the longitudinal direction with respect to said carrier means.

3. A blade as set forth in claim 2 further characterized in that the generally elliptical cross sectional shape of each of said inserts is constant throughout its length, and said inserts being arranged adjacent one another in said carrier means to provide a series of valleys and ridges of said harder material, said cutting edge being defined by relieved side edges of said carrier means and thereby having alternately hard and less hard segments so that normal use tends to wear away the latter segments faster than the former with the result that said cutting edge tends to become serrated with use rather than merely becoming dulled.

4. A blade as set forth in claim 3 further characterized in that said carrier means comprises oppositely arranged layers of material each of which defines an alternating series of valleys and ridges, said valleys and ridges in one layer cooperating with those in the other layer to define said laterally outwardly opening cavities.

* * * * *